(12) United States Patent
Bon et al.

(10) Patent No.: US 10,612,807 B2
(45) Date of Patent: Apr. 7, 2020

(54) HVAC, REFRIGERATION, AND AUTOMATION EQUIPMENT MANAGEMENT

(71) Applicant: Lennox Industries Inc., Richardson, TX (US)

(72) Inventors: David J. Bon, Gunter, TX (US); Charles Thomas Ferguson, Flower Mound, TX (US); Anna Vishinsky, Little Elm, TX (US); Veera Reddy Vemula, McKinney, TX (US); Farhad Abrishamkar, Dallas, TX (US)

(73) Assignee: Lennox Industries Inc., Richardson, TX (US)

( * ) Notice: Subject to any disclaimer, the term of this patent is extended or adjusted under 35 U.S.C. 154(b) by 196 days.

(21) Appl. No.: 15/874,580

(22) Filed: Jan. 18, 2018

(65) Prior Publication Data

US 2018/0209679 A1    Jul. 26, 2018

Related U.S. Application Data

(60) Provisional application No. 62/448,692, filed on Jan. 20, 2017, provisional application No. 62/448,597, filed on Jan. 20, 2017.

(51) Int. Cl.
    *F24F 11/00*    (2018.01)
    *G05B 15/02*    (2006.01)
    (Continued)

(52) U.S. Cl.
    CPC .............. *F24F 11/58* (2018.01); *F24F 11/32* (2018.01); *F24F 11/38* (2018.01); *F24F 11/46* (2018.01);
    (Continued)

(58) Field of Classification Search
    CPC .. F24F 11/32; F24F 11/38; F24F 11/46; F24F 11/58
    See application file for complete search history.

(56) References Cited

U.S. PATENT DOCUMENTS

| | | | | |
|---|---|---|---|---|
| 9,696,056 | B1* | 7/2017 | Rosenberg | ............... F24F 11/30 |
| 2003/0041135 | A1* | 2/2003 | Keyes | ...................... G05B 9/03 |
| | | | | 709/223 |

(Continued)

OTHER PUBLICATIONS

Extended European Search Report for Application No./Patent No. 18152627.8-1204—dated Jun. 15, 2018.

*Primary Examiner* — Mark A Connolly
(74) *Attorney, Agent, or Firm* — Baker Botts L.L.P.

(57) ABSTRACT

An equipment management system including a controller and a server. The controller communicatively couples to one or more remote systems. At least one of the remote systems includes a heating, ventilation, and air conditioning (HVAC) system, a refrigeration system, or a building automation system. The controller receives telemetry data associated with the operation of the one or more remote systems and with individual components of the one or more remote systems. The controller communicates at least a portion of the received telemetry data to the server. The server determines one or more operational commands for the one or more remote systems. The one or more operational commands are determined based on the telemetry data communicated from the controller to the server. The server communicates the one or more operational commands to the controller. The controller communicates the one or more operational commands to the one or more remote systems.

21 Claims, 5 Drawing Sheets

(51) Int. Cl.
*F24F 11/58* (2018.01)
*F24F 11/46* (2018.01)
*F24F 11/32* (2018.01)
*F24F 11/38* (2018.01)
*F24F 11/52* (2018.01)
*F25D 29/00* (2006.01)
*F24F 11/61* (2018.01)
*F24F 140/60* (2018.01)

(52) U.S. Cl.
CPC ............ *F24F 11/52* (2018.01); *F25D 29/008* (2013.01); *G05B 15/02* (2013.01); *F24F 11/61* (2018.01); *F24F 2140/60* (2018.01); *G05B 2219/2642* (2013.01)

(56) References Cited

U.S. PATENT DOCUMENTS

| | | | |
|---|---|---|---|
| 2015/0042240 A1* | 2/2015 | Aggarwal | H04W 4/70 |
| | | | 315/292 |
| 2015/0081107 A1* | 3/2015 | Graham | G05B 15/02 |
| | | | 700/276 |
| 2015/0369503 A1 | 12/2015 | Flaherty et al. | |
| 2016/0102877 A1 | 4/2016 | Griffin et al. | |
| 2016/0132839 A1* | 5/2016 | Randolph | G06Q 10/20 |
| | | | 705/305 |
| 2016/0246269 A1* | 8/2016 | Ahmed | F24F 11/62 |

\* cited by examiner

Telemetry Data

| HVAC System | Refrigeration System | Automation System |
|---|---|---|
| On/Off | On/Off | Light 1: On/Off |
| Partial Load | Temp Set Point | Light 2: On/Off |
| Temp Set Point | Total Power | Security Lock: Engaged |
| Total Power | | |
| Compressor 1: On/Off | Compressor 1: On/Off | Occupancy Sensor 1 |
| Compressor 1 Temp | Compressor 1 Temp | ... |
| Internal Sensor 1 Temp | Refrigerant Sensor 1 Temp | Space Temp Sensor 1 |
| Internal Sensor 1 Pressure | Refrigerant Sensor 1 Pressure | Outside Temp Sensor |
| Component 1 Power Usage | Fan 1: On/Off | Equipment 1 Power |
| ... | ... | ... |

FIGURE 3

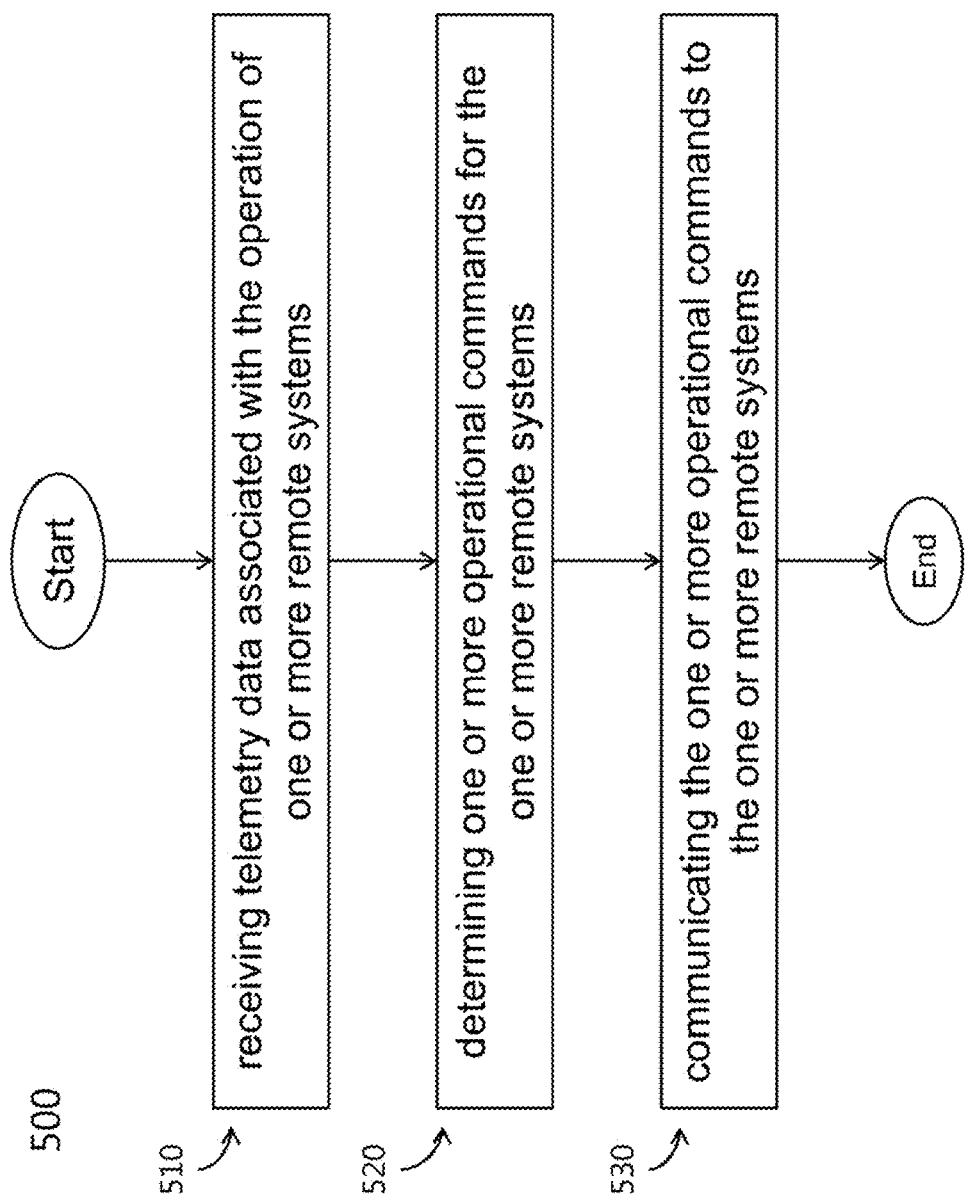

HVAC, REFRIGERATION, AND AUTOMATION EQUIPMENT MANAGEMENT

RELATED APPLICATIONS

This application claims priority to and the benefit of U.S. Provisional Patent Application No. 62/448,597, filed Jan. 20, 2017 and entitled "HVAC AND AUTOMATION EQUIPMENT CONTROLLER" and U.S. Provisional Patent Application No. 62/448,692, filed Jan. 20, 2017 and entitled "BUILDING AUTOMATION," the contents of which are herein incorporated by reference in their entirety.

TECHNICAL FIELD

Certain embodiments of this disclosure relate generally to systems including one or more heating, ventilation, and air conditioning (HVAC) systems, refrigeration systems, or automation systems generating telemetry data, and more specifically, using enhanced telemetry data associated with individual components of the systems to control one or more components of the systems.

BACKGROUND

Buildings, sites, or other spaces may include one or more systems, including one or more of a heating, ventilation, and air conditioning (HVAC) system, a refrigeration system, or a automation system. Each system may generate its own telemetry data, data which may include measurements and status indicators at those systems, which may be transmitted to equipment management systems for monitoring and/or control of those systems at a remote location. Conventional systems only generate and communicate basic telemetry data, such as whether a particular system is on or off, what mode the system is running on, currently configured setpoints, and/or the total power consumed. This basic telemetry data is of limited use and due to its relative simplicity, may be transmitted using conventional protocols that are suitable to transmit the small amount of data generated at these systems. However, each of these systems includes components and internal sensors, which are not being monitored outside of internal control systems. If accessible, this information may be used to more closely monitor and understand the operation of those respective systems. Furthermore, when more than one of these systems is in close proximity or are present at the same site, the operation of each system may affect the performance of the other. In this manner, conventional use of telemetry data from these systems provides limited benefits when the telemetry data is so limited and data from each system is siloed to its respective controller.

SUMMARY OF THE DISCLOSURE

According to one embodiment, an equipment management system includes a controller and a server. The controller is configured to communicatively couple to one or more remote systems. At least one of the remote systems includes a heating, ventilation, and air conditioning (HVAC) system, a refrigeration system, or a building automation system. The controller is further configured to receive telemetry data associated with the operation of the one or more remote systems. The received telemetry data includes data associated with individual components of the one or more remote systems. The controller is further configured to communicate at least a portion of the received telemetry data to the server. The server is configured to determine one or more operational commands for the one or more remote systems. The one or more operational commands are determined based on the telemetry data communicated from the controller to the server. The server is further configured to communicate the one or more operational commands to the controller. The controller further configured to communicate the one or more operational commands to the one or more remote systems.

In particular embodiments, the equipment management system is further configured to analyze the received telemetry data in order to make a prediction of when the one or more remote systems will require maintenance. The equipment management system is further configured to communicate an indication to a user that indicates the prediction of when the one or more remote systems will require maintenance.

In particular embodiments, the server is further configured to instruct the controller to suppress one or more types of alerts. The controller is further configured to receive a plurality of alerts from the remote systems. The controller is further configured to suppress a subset of the alerts that correspond to the one or more types of alerts that the server has instructed the controller to suppress. The controller is further configured to communicate to the server a subset of the alerts other than the one or more types of alerts that the server has instructed the controller to suppress.

In particular embodiments, the server is further configured to receive an instruction to suppress one or more types of alerts from being communicated to a user. The server is further configured to receive a plurality of alerts from the one or more remote systems. The plurality of alerts are received via the controller. The server is further configured to suppress a subset of the alerts that correspond to the one or more types of alerts that the server has been instructed to suppress. The server is further configured to communicate to the user a subset of the alerts other than the one or more types of alerts that the server has been instructed to suppress.

In particular embodiments, the received telemetry data further includes energy usage information of individual components of the one or more remote systems. The operational commands are based on the energy usage information.

In particular embodiments, the operational commands are further based on a predetermined schedule and/or predetermined dependency rules between one or more individual components of the one or more remote systems.

In particular embodiments, the equipment management system is configured to receive user-input over a network and to use the user input to control the operation of the one or more remote systems.

In particular embodiments, the one or more remote systems include a first remote system associated with a first customer and a second remote system associated with a second customer that is different than the first customer. The equipment management system is configured to receive user input form the first customer. The equipment management system is further configured to control the operation of the first remote system based on the user input received from the first customer. When controlling the operation of the second remote system, the equipment management system is configured to ignore the user input received from the first user.

According to another embodiment, a method for managing equipment includes receiving telemetry data associated with the operation of one or more remote systems. The received telemetry data includes data associated with individual components of the one or more remote systems. At least one of the remote systems includes a heating, ventilation, and air conditioning (HVAC) system, a refrigeration system, or a building automation system. The method further includes determining one or more operational commands for the one or more remote systems. The one or more operational commands are determined based on at least a portion of the telemetry data. The method further includes communicating the one or more operational commands to the one or more remote systems.

In particular embodiments, the method further includes analyzing the received telemetry data in order to make a prediction of when the one or more remote systems will require maintenance. The method further includes communicating an indication to a user that indicates the prediction of when the one or more remote systems will require maintenance.

In particular embodiments, the method further includes receiving a plurality of alerts from the remote systems. The method further includes suppressing a subset of the alerts based on at least the received telemetry data associated with the operation of one or more remote systems.

In particular embodiments, the method further includes receiving an instruction to suppress one or more types of alerts from being communicated to a user. The method further includes receive a plurality of alerts from the one or more remote systems. The method further includes suppressing a subset of the alerts that correspond to the one or more types of alerts that the server has been instructed to suppress. The method further includes communicating to the user a subset of the alerts other than the one or more types of alerts that has been instructed to suppress.

In particular embodiments, the received telemetry data further includes energy usage information of individual components of the one or more remote systems. The operational commands are based on the energy usage information.

In particular embodiments, the operational commands are further based on a predetermined schedule and/or predetermined dependency rules between one or more individual components of the one or more remote systems.

In particular embodiments, the method further includes receiving user-input over a network. The method further includes using the user input to control the operation of the one or more remote systems.

In particular embodiments, the one or more remote systems include a first remote system associated with a first customer and a second remote system associated with a second customer that is different than the first customer. The method further includes receiving user input form the first customer. The method further includes controlling the operation of the first remote system based on the user input received from the first customer. When controlling the operation of the second remote system, the method further includes ignoring the user input received from the first user.

According to yet another embodiment, a non-transitory computer readable medium including instructions causing processing circuitry to receive telemetry data associated with the operation of one or more remote systems. The received telemetry data includes data associated with individual components of the one or more remote systems. At least one of the remote systems includes a heating, ventilation, and air conditioning (HVAC) system, a refrigeration system, or a building automation system. The computer readable medium also includes instructions causing processing circuitry to determine one or more operational commands for the one or more remote systems. The one or more operational commands are determined based on at least a portion of the telemetry data. The computer readable medium also includes instructions causing processing circuitry to communicate the one or more operational commands to the one or more remote systems.

In particular embodiments, the instructions further cause the processing circuitry to analyze the received telemetry data in order to make a prediction of when the one or more remote systems will require maintenance. The instructions further cause the processing circuitry to communicate an indication to a user that indicates the prediction of when the one or more remote systems will require maintenance.

In particular embodiments, the instructions further cause the processing circuitry to receive a plurality of alerts from the remote systems. The instructions further cause the processing circuitry to suppress a subset of the alerts based on at least the received telemetry data associated with the operation of one or more remote systems.

In particular embodiments, the one or more remote systems include a first remote system associated with a first customer and a second remote system associated with a second customer that is different than the first customer. The instructions further cause the processing circuitry to receive user input form the first customer. The instructions further cause the processing circuitry to control the operation of the first remote system based on the user input received from the first customer. When controlling the operation of the second remote system, the instructions further cause the processing circuitry to ignore the user input received from the first user.

Certain embodiments may provide one or more technical advantages. For example, certain embodiments may use telemetry data associated with the operation of the one or more remote HVAC, refrigeration, and automation systems including data associated with individual components of the one or more remote systems to control the one or more remote systems. Because of the use of this more specific and detailed telemetry data, the monitoring and control of the remote systems may be enhanced. For example, the additional telemetry data may provide additional transparency into the operation of the components of the one or more remote systems, which may then be used to compile detailed statistics of their operation over time and of the effects each system has on the others. As another example, certain embodiments may predict when one or more of the remote systems will require maintenance based on the received telemetry data. In response, certain embodiments may notify the operator or user of the remote systems to alert the user to conduct maintenance on the particular system. As yet another example, certain embodiments allow a user to interact with the equipment management system to provide direct control of the remote systems and/or input of information associated with the equipment under that user's control. In this manner, users may have easier remote access to the variety of systems under their control and provide information that can be used by the equipment management system to control those systems.

Certain embodiments may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure, reference is now made to the following description, taken in conjunction with the accompanying drawings, in which.

Figure 2:
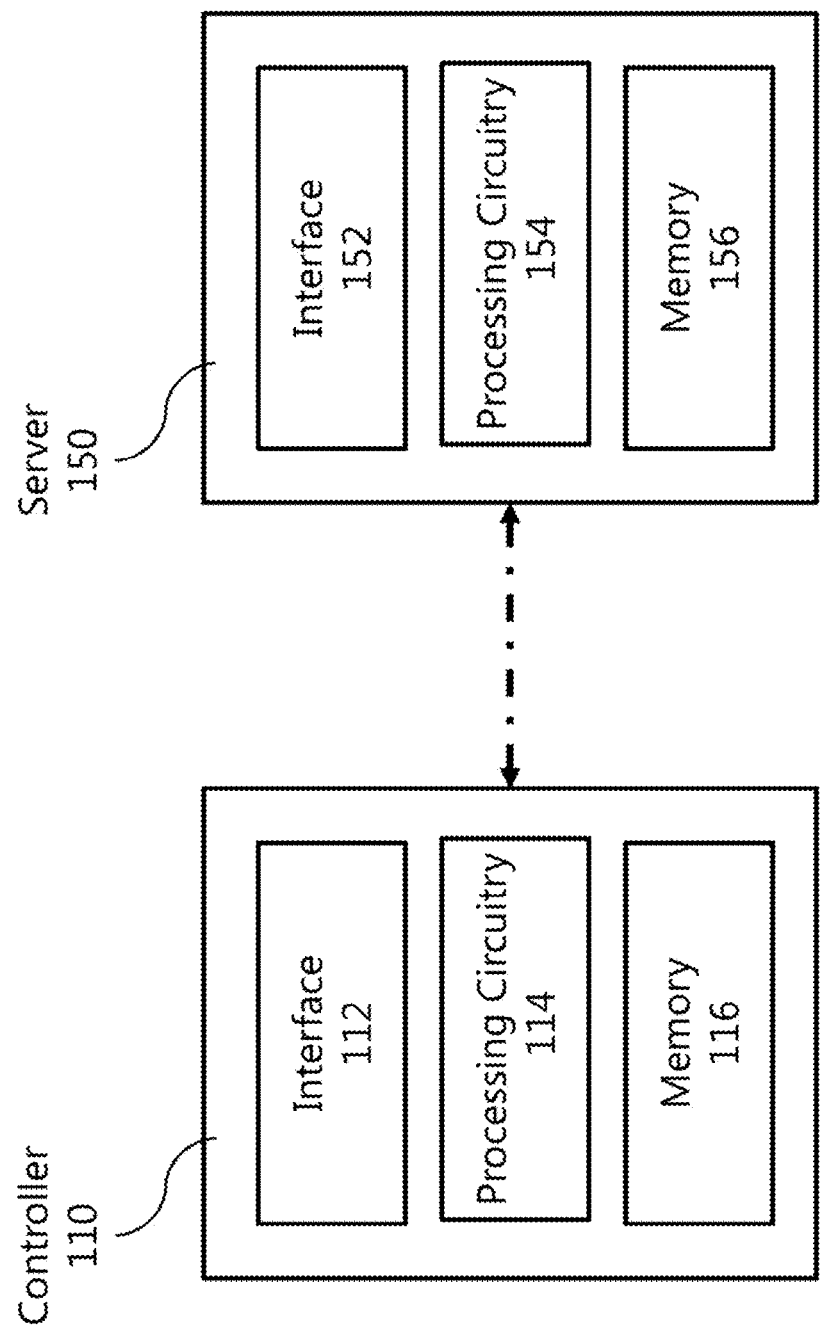
Figure 4:
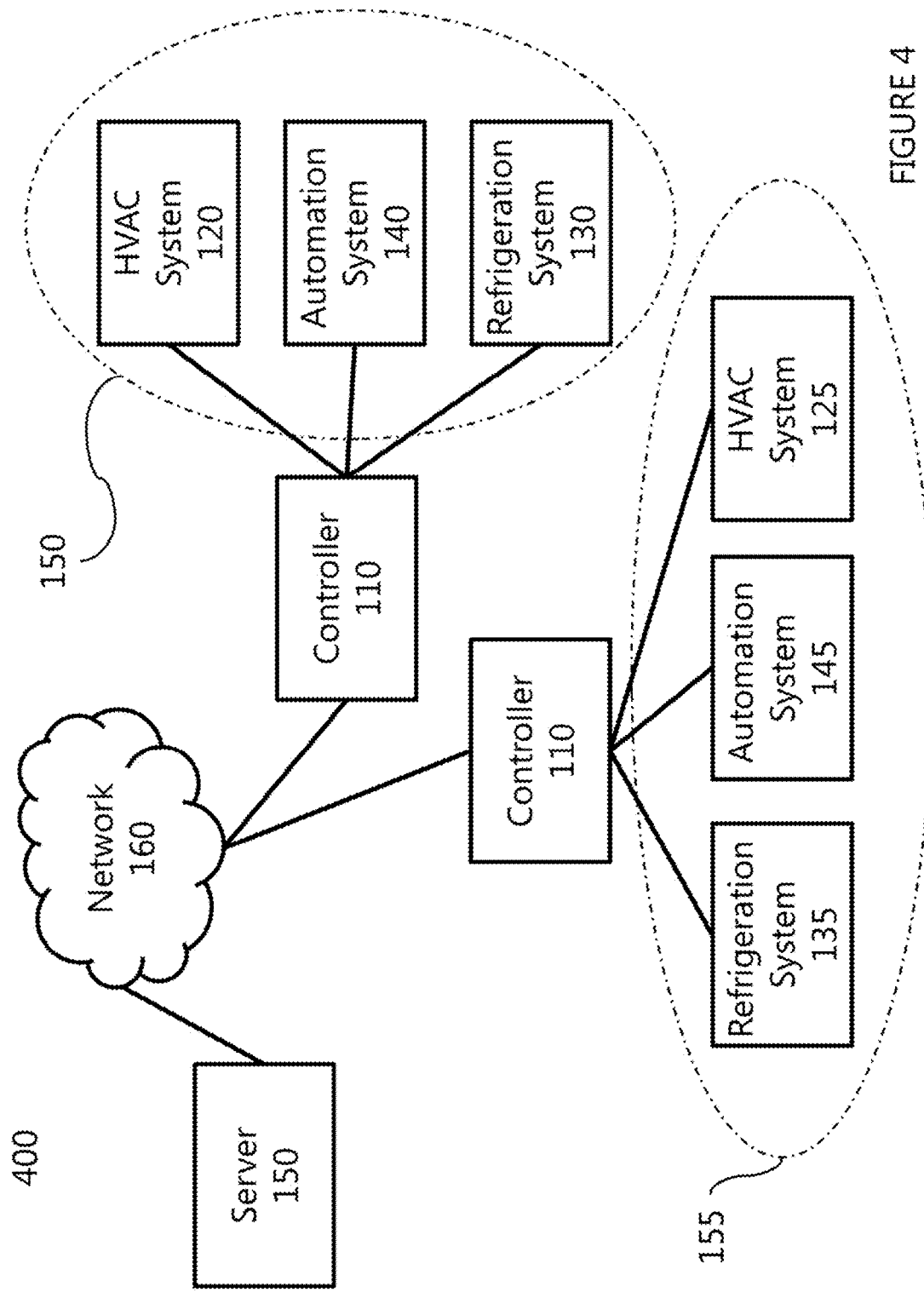

system, a refrigeration system, or an automation system, according to certain embodiments;

FIG. 2 illustrates an example a controller and server connected to the system, according to some embodiments;

FIG. 3 is an example array of telemetry data that may be generated by the example system, according to certain embodiments;

FIG. 4 illustrates an example system including two sets of equipment, according to certain embodiments; and FIG. 5 is a flowchart diagram of an example method of using the example system, according to certain embodiments.

DETAILED DESCRIPTION

Embodiments of the present disclosure and its advantages are best understood by referring to FIGS. 1 through 5 of the drawings, like numerals being used for like and corresponding parts of the various drawings.

Buildings and other structures often utilize equipment to provide an optimal environment. A number of devices and equipment may be placed within a building to provide heating, cooling, lighting, airflow, refrigeration, energy monitoring, among other desired functions. For example, a building may include one or more of a heating, ventilation, and air conditioning (HVAC) system, a refrigeration system, and an automation system. Each of these pieces of equipment not only has to be installed, but also programmed to run at certain times or in response to certain inputs. Each system may generate its own telemetry data, data that may include measurements and status indicators at those systems, which may be transmitted to equipment management systems for monitoring and/or control of those systems at a remote location. For example, remote systems may be considered to be in a remote location relative to the equipment management system in the sense that at least some of the components of the remote system are external from the equipment management system (e.g., at least some of the components of the remote system are coupled to the equipment management system via a communication link, such as a network).

Conventional systems only generate limited telemetry data, which is not particularly useful in monitoring the performance or controlling the operation of each system. However, each of these systems may include internal components and sensors, which may be used to generate many additional telemetry data values to be communicated outside each respective system. Certain embodiments of the present disclosure may use this enhanced telemetry data in a variety of ways, including measuring the performance of individual components of each system, predicting maintenance of systems, optimizing the operation of each system individually and in combination with other systems, and controlling each system with finer detail. This disclosure contemplates systems and methods that may provide an efficient solution to controlling, scheduling, and maintaining the various pieces of equipment that are installed in a particular space by accessing telemetry data generated at each system.

Figure 1:
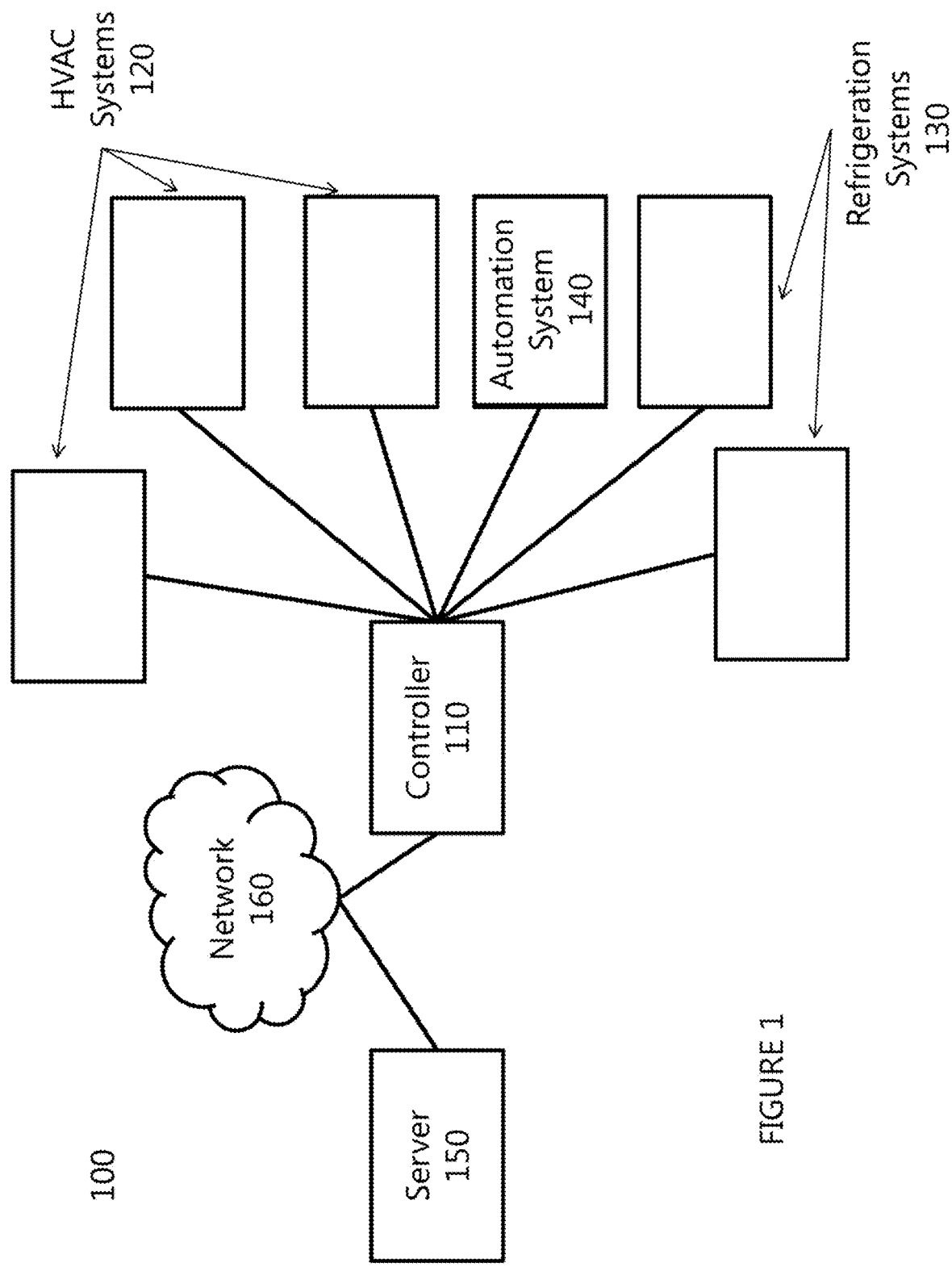
FIG. 1 illustrates an example system including one or more of a heating, ventilation, and air conditioning (HVAC)

FIG. 1 illustrates an example equipment management system 100 including one or more heating, ventilation, and air conditioning (HVAC) systems 120, refrigeration systems 130, and an automation system 140, according to certain embodiments. Each of the HVAC systems 120, refrigeration systems 130 and automation system 140 may be configured to have a variety of HVAC, refrigeration, and automation equipment with different functions and capabilities. For example, each HVAC system 120 may include one or more HVAC units serving different areas of a building. Similarly, each refrigeration system 130 may include one or more refrigeration units at different locations at a site or within a building. Likewise, automation system 140 may include control systems for dozens of light fixtures, security systems, and monitoring sensors spread across multiple floors and rooms of one or more buildings.

HVAC systems 120 may be controlled by the controller 110 and/or server 150 based on temperature set points and/or the occupancy of a space covered by the HVAC systems 120. Server 150 may be used to set a schedule for the operation of the HVAC equipment 120 which may include the changing of settings, such as temperature set points and occupancy settings, based on the date, day of the week, time of day, or other characteristics. Example of HVAC equipment that may be present in HVAC systems 120 may include, but are not limited to, air conditioners, heaters, condensing units, ventilation units, window units, wall units, and air filtration systems. HVAC systems 120 may also include blowers and fans, including any type of blower or fan for moving a volume of air or gas.

A space may also include refrigeration systems 130, which may also be controlled through controller 110 and/or server 150. Refrigeration systems 130 may include one or more coolers, freezers, refrigeration cases, etc., which may provide a more localized environmental control to specific spaces within a building. Examples of refrigeration equipment that may be present in refrigeration systems 130 may include, but are not limited to, reach-in refrigerators, reach-in freezers, merchandising refrigerators, merchandising freezers, walk-in refrigerators, walk-in freezers, commercial refrigerators, and commercial freezers.

A space may also include automation system 140, which can be automated and/or controlled based on certain conditions. Such automation equipment 130 may include lights, kitchen equipment, sensors, door locks, or any other devices that may be controlled and/or operated. The controller 110 and/or server 150 may operate to set a schedule for the operation of the automation systems 140 which may include the changing of settings, such as temperature set points and occupancy settings, based on the date, day of the week, time of day, or other characteristics. Controller 110 and/or Server 150 may operate to communicate alerts based on information received by HVAC systems 120, refrigeration systems 130, and/or automation equipment 140.

Each of HVAC systems 120, refrigeration systems 130 and automation system 140 may include components such as sensors and switches that work with the functional portions of each system to sense the conditions within each system and control its operation. Examples of sensors include, but are not limited to, temperature sensors, humidity sensors, light sensors, occupancy sensors, motion sensors, proximity sensors, sound sensors, touch sensors, and pressure sensors. Examples of switches include, but are not limited to, pressure switches, toggle switches, mechanical switches, electronic switches, mercury tilt switches, touch switches, push button switches, rotary switches, and momentary switches. Each sensor and/or switch may generate telemetry data, which may be communicated to controller 110.

Controller 110 may be communicatively coupled to one or more of HVAC systems 120, refrigeration systems 130, and automation system 140. For example, controller 110 may be local to the building at which each of HVAC systems 120, refrigeration systems 130, and automation system 140 is located, or may be remote to the location of the building, but coupled to one or more of the systems through a communication link or links. As described in further detail below, controller 110 may be configured to receive data from each of HVAC systems 120, refrigeration systems 130, and automation system 140. In this manner, controller may receive telemetry data from each system, which may be used at controller 110 and/or at server 150 to monitor and control the operation of each of HVAC systems 120, refrigeration systems 130, and automation system 140.

Server 150 may receive data from controller 110. This data may include telemetry data associated with the operation of the equipment in HVAC systems 120, refrigeration systems 130, and automation system 140. In certain embodiments, system 100 further includes network 160. Network 160 may be any communications network, such as a private network, a public network, a connection through the internet, a mobile network, a WI-FI network, etc. Controller 110 and server 150 may communicate over network 160, including communicating telemetry data from controller 110 to server 150 and operational instructions from server 150 to controller 110. Telemetry data generated at each respective system may reflect a variety of measurements and/or operational characteristics of each system, including the operation of individual components within each system. The telemetry data may also reflect internal measurements within the components of each system. Certain examples of telemetry data are further described below in reference to FIG. 3.

In certain embodiments, controller 110 and server 150 work together to control HVAC systems 120, refrigeration systems 130, and automation system 140. For example, controller 110 may include the necessary interfaces to receive the telemetry data from each system and communicate at least a portion of the received telemetry data to server 150. Server 150 may then determine one or more operational commands for HVAC systems 120, refrigeration systems 130, and automation system 140 based on the communicated telemetry data. Server 150 may communicate these commands to controller 110, which in turn, may communicate the one or more operational commands to HVAC systems 120, refrigeration systems 130, and automation system 140. In this manner, controller 110 may serve a gateway function between the variety of remote systems and server 150. Server 150 and controller 110 may be located at different physical locations. Accordingly, server 150 may be configured to do the bulk of analysis and processing of telemetry data to generate the operational commands, whereas controller 110 may be configured to sort through the received telemetry data (e.g., in order to determine which telemetry data to send to server 150) and translate between various protocols to a standard protocol for communicating the telemetry data to server 150.

FIG. 2 illustrates an example controller and server connected to a system having HVAC systems 120, refrigeration systems 130, and/or automation equipment 140 such as controller 110 and server 150 of system 100 described with respect to FIG. 1, in accordance with certain embodiments. In certain embodiments, controller 110 may include a thermostat or may be in communication with a thermostat. Controller 110 includes one or more interface(s) 112, processing circuitry 114, and memory 116.

In some embodiments, interface 112 facilitates communicating signals to/from HVAC systems 120, refrigeration systems 130, and/or automation equipment 140. Processing circuitry 114 executes instructions to provide some or all of the control functionality for the HVAC systems 120, refrigeration systems 130, and/or automation equipment 140. Processing circuitry 114 may process data received from HVAC systems 120, refrigeration systems 130, and/or automation equipment 140. Memory 116 stores the instructions for execution by processing circuitry 114 and any other suitable type of data such as data received HVAC systems 120, refrigeration systems 130, and/or automation equipment 140. As an example, processing circuitry 114 may determine a heating set point based on an input received from interface 112, determine to turn components of the HVAC systems 120, refrigeration systems 130, and/or automation equipment 140 on or off based on instructions and/or configuration settings stored in memory 116, and communicate signals via interface 112 to cause the components of the HVAC systems 120, refrigeration systems 130, and/or automation equipment 140 to turn on or off, for example, in order to reach the set point. Processing circuitry 114 may generate alerts to indicate that one or more pieces of equipment is not performing within a predetermined threshold.

Interface 112 may comprise a wired or wireless interface and may be configured to communicate with components of the HVAC systems 120, refrigeration systems 130, and/or automation equipment 140 through any suitable network. Processing circuitry 114 may include any suitable combination of hardware and software implemented in one or more modules to execute instructions and manipulate data to perform some or all of the described functions. In some embodiments, processing circuitry 114 may include, for example, one or more computers, one or more central processing units (CPUs), one or more microprocessors, one or more applications, one or more application specific integrated circuits (ASICs), one or more field programmable gate arrays (FPGAs) and/or other logic.

In certain embodiments, interface 112 includes a plurality of interfaces that are configured to communicate with one or more protocols of the HVAC systems 120, refrigeration systems 130, and/or automation equipment 140. For example, each type of system may use a different protocol for transmitting telemetry data. In some examples, interface 112 may include interfaces that are configured to receive information from each type of system using the internal protocols used by each respective system. In this manner, interface 112 may receive telemetry data that had previously not been available outside of the individual system. In some embodiments, interface 112 may include a further interface to communicate with server 150 using a different protocol used to receive telemetry data from one or more of HVAC systems 120, refrigeration systems 130, and/or automation equipment 140. In this manner, controller 110 may relay the useful telemetry data to server 150 without server 150 being configured to receive information from each respective system that may use a separate protocol. Further, server 150 may also receive information about different types of systems over a transmission from a single location, e.g., controller 110.

Memory 116 is generally operable to store instructions, such as a computer program, software, an application including one or more of logic, rules, algorithms, code, tables, etc. and/or other instructions capable of being executed by a processor. Examples of memory include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information, data, and/or instructions that may be used by processing circuitry 114 of server 110.

Server 150 may include one or more interface(s) 152, processing circuitry 154, and memory 156. In some embodiments, interface 152 facilitates communicating signals to/from controller 110. For example, interface 152 may communicate with controller 110 over a network. In some examples, interface 152 may provide a direct connection between server 150 and 110 without an intervening network. Server 150 may include processing circuitry 154 that executes instructions to provide some or all of the control functionality for the HVAC systems 120, refrigeration systems 130, and/or automation equipment 140. For example, processing circuitry 154 may execute instructions to process telemetry data received from HVAC systems 120, refrigeration systems 130, and/or automation equipment 140. The processed telemetry data may be used to determine operational commands for each system and to monitor the performance of each system. Server 150 may include memory 156 operable to store instructions, such as a computer program, software, and/or an application including one or more of logic, rules, algorithms, code, tables, etc.

Other embodiments of controller 110 and/or server 150 may include additional components beyond those shown in FIG. 2 that may be responsible for providing certain aspects of controller 110 or server 150's functionality, including any of the functionality described above and/or any additional functionality (including any functionality necessary to support the solution described above). As just one example, controller 110 may include input devices and output devices. Input devices include mechanisms for entry of data into controller 110. For example, input devices may include input mechanisms, such as a microphone, input elements, a display, a keyboard, etc. Output devices may include mechanisms for outputting data in audio, video, and/or hard copy format. For example, output devices may include a speaker, a display, etc. Input devices and output devices may be provided at controller 110 in order to provide communication between controller 110 and HVAC systems 120, refrigeration systems 130, and/or automation equipment 140.

While server 150 and controller 110 have been described as separate apparatus, in certain embodiments, one or more features or functions of server 150 may be integrated into controller 110 and vice versa. For example, controller 110 may be configured to process telemetry data to determine operational commands to control HVAC systems 120, refrigeration systems 130, and/or automation equipment 140. In some embodiments, controller 110 may be distributed over a plurality of controlling modules located at different portions of a building having HVAC systems 120, refrigeration systems 130, and/or automation equipment 140.

FIG. 3 is an example array 300 of telemetry data that may be generated by system 100, according to certain embodiments. HVAC systems 120, refrigeration systems 130, and/or automation equipment 140 may generate data through measurements of certain values in or around each system, including measurements at one or more sensors. Sensors may include discrete sensors and/or analog sensors. Discrete sensors are generally binary sensors. For example, a discrete sensor may indicate whether equipment is on or off, whether a door is open or shut, or any other type of discrete data. Analog sensors, however, generally collect continuous data that is not discrete. For example, an HVAC systems 120 may include temperature sensor that measures the temperature of a refrigerant at a supply temperature and/or a return temperature over a continuous range of temperatures. Much of this data had conventionally been siloed inside the individual system and its internal controls. As such, this data was not generated as telemetry data for further transmission outside of each system.

In some embodiments, the only telemetry data available from HVAC systems 120, refrigeration systems 130, and/or automation equipment 140 is basic telemetry 310. As shown in array 300, basic telemetry 310 may be limited to basic indications whether a certain system is on or off, the mode the system is running in, target set points, overall power consumption, and whether certain equipment is on or off. While basic telemetry 310 may be useful, it fails to provide insight into the operation of individual components of each of HVAC systems 120, refrigeration systems 130, and/or automation equipment 140, which may affect the optimal performance settings and operation of each system.

As discussed above, controller 110 may be configured to interface with each type of system allowing the transmission of additional telemetry data that is conventionally limited to internal controlling of the system. For example, certain embodiments of controller 110 may receive additional telemetry data, an example of which is enhanced telemetry 320 in array 300. As shown in FIG. 3, enhanced telemetry 320 may include additional telemetry that is associated with individual components of HVAC systems 120, refrigeration systems 130, and/or automation equipment 140. Each type of system may generate different types of enhanced telemetry 320. For example, HVAC systems 120 may generate telemetry data that indicates the on/off status and temperatures at each compressor. In this manner, enhanced telemetry 320 may be used to isolate poor performance of HVAC systems 120 or consider the optimal performance based on the number of compressors running in particular circumstances. Similarly, refrigeration systems 130 may generate addition data that may be included in enhanced telemetry, such as the temperatures and pressures of one or more refrigerant at one or more cooling cycles. Likewise, automation systems 140 may generate data that may be included in enhanced telemetry 320, such as the individual power usage of various pieces of equipment or occupancy sensing data. In this manner, enhanced telemetry 320 may augment basic telemetry 310 to provide more granular detail about the operation of each system, which may then be used to monitor and control the systems more effectively.

In certain embodiments, telemetry data is communicated continuously to controller 110. When the telemetry data only includes basic telemetry 310, such communications are not overly onerous. The addition of enhanced telemetry 320, however, presents several technical challenges. For example, continuously communicating data may require a relatively large amount of network bandwidth. As another example, server 150 may be required to process the data as it is received from controller 110, requiring a relatively large amount of processor usage. In certain embodiments, controller 110 may only communicate a subset of the telemetry data to server 150 by communicating a subset of the telemetry to server 150 that has changed allowing the equipment to communicate a smaller amount of data. Communicating a smaller amount of data reduces network bandwidth requirements and processing requirements.

In certain embodiments, the equipment management system 100 provides the ability to monitor and control HVAC system 120, refrigeration system 130, and automation system 140 from a single control system. For example, equipment management system 100 may be used to monitor and control HVAC system 120, refrigeration system 130, and automation system 140 in restaurants, convenience stores, and school cafeterias.

The equipment management system 100 may be configured to monitor and control different systems using proprietary or universal protocols. Examples of protocols include, but are not limited to, S-bus protocols and Modbus protocols. The ability to monitor and control each of HVAC system 120, refrigeration system 130, and automation system 140 allows the equipment management system 100 to capture operational data in much greater detail than existing systems and/or to perform load balancing. As a specific example, load balancing may help to reduce unnecessary wasted heat from the refrigeration system which would otherwise increase the load on the HVAC system.

In existing systems, maintenance is performed on a periodic basis, when an alarm is triggered, or when something fails. The equipment management system 100 may enable the ability to predict maintenance needs and to reduce the number of service calls or truck rolls. In certain embodiments, the equipment management system 100 may collect operating information equipment of one or more of HVAC system 120, refrigeration system 130, and automation system 140, such as a plurality of roof-top units (RTUs) of HVAC system 120. The collected information may be used to determine performance trends and to predict a need for unit maintenance. The collected information may also be compared analytical performance models to determine actual unit efficiency versus the predicted unit efficiency. If the actual performance is significantly different then the predicted efficiency, then further investigation may be necessary. In some embodiments, equipment management system 100 may collect and analyze data in real-time. In other embodiments, the equipment management system 100 may send collected information to a remote server for analysis and processing.

In certain embodiments, equipment management system 100 may analyze the received telemetry data to make a prediction of when one of the systems will require maintenance and communicate an indication to a user of that prediction. For example, an operator may be alerted to the predicted need of maintenance to a RTU, which may preempt the failure of the RTU. This may prevent the need for emergency repairs and replacements that are not only costly but impact businesses in which these systems are located.

The collected information from HVAC system 120, refrigeration system 130, and automation system 140 may include unit alerts. These alerts may be generated in response to failure of one or more components or may include more benign alerts, such as a freezestat alert when the intake air is below freezing. An operator may want to avoid unimportant or duplicative alerts to avoid site-owner anxiety and/or to reduce unnecessary maintenance calls. In certain embodiments, server 150 is further configured to instruct controller 110 to suppress one or more types of alerts. Controller 110 may receive a plurality of alerts from the various systems coupled to it and suppress a subset of the alerts that correspond to the one or more types of alerts that server 150 has indicated for suppression. Alerts that are not suppressed may then be communicated to server 150, which may be viewed or received by the operator of those systems.

In certain embodiments, server 150 suppresses certain alerts. For example, server 150 may receive an instruction to suppress one or more types of alerts from being communicated to a user. Controller 110 may forward one or more alerts from the systems to server 150, which may then suppress alerts matching the types instructed to suppress. Server 150 may then only forward alerts to the user that have not been suppressed. In this manner, equipment management system 100 may suppress unnecessary or unwanted alerts based on user and/or operator preference through server 150 and/or controller 110.

Existing systems employ multiple discrete systems for monitor energy consumption and controlling equipment such as HVAC systems. Equipment management system 100 may provide an integrated system that is configurable to both monitor energy consumption and control equipment. For example, the equipment management system 100 provides the ability to optimize energy usage of an HVAC system through direct monitoring of the building loads and/or the HVAC system itself.

In one embodiment, the equipment management system 100 is configured to collect metrics about the performance of one or more of HVAC system 120, refrigeration system 130, and automation system 140 and individual components thereof. For example, the received telemetry data may include energy usage information of individual components of the different systems. The collected metrics may be mined and processed to improve efficiencies, reduce costs, and increase reliability. The operational commands from server 150 may be further based on this energy usage information. In this manner, energy usage information may be incorporated into the integrated control system to reduce wasteful energy use without compromising performance. As further described in the examples below, in certain embodiments, the equipment management system 100 is configured to determine a status of building automation equipment (such as whether a fryer or an exhaust fan is turned on), determine an operational command to send to the HVAC system based on the status of the building automation equipment (e.g., an operational command configured to improve energy usage of the HVAC system when the building automation equipment is configured according to the current status), and send the operational command to the HVAC unit.

In certain embodiments, equipment management system 100 is configured to monitor energy consumption of building, at which the systems are located, and of individual branch loads. By monitoring branch loads, equipment management system 100 can both measure the power consumption of the equipment attached to the branch and determine when equipment is operating or idle. This branch load information may be combined with other building metrics to provide additional data mining opportunities. For example, a fast food restaurant may have several fryers that are monitored by equipment management system 100. The fryers are in an air conditioned space (e.g. the kitchen). When the fryers are active, they heat up the kitchen which increases the load on HVAC system 120. Information collected about the fryer usage and HVAC system 120 operation over time, may be analyzed and processed to improve the efficiency of the equipment management system 100. For example, the automation system may disable several of the fryers during slow periods to reduce loads on the HVAC system 120 and to save energy.

In certain embodiments, equipment management system 100 uses different threshold and/or historical data to detect different conditions and to control equipment based on the detected conditions. Using different thresholds and/or historical data allows the equipment management system 100 to identify trends while filtering out and ignoring random events and outliers.

In certain embodiments, equipment management system 100 may determine the impact on energy consumption for various equipment, for example, exhaust fans. When a space generates a lot of heat, for example, a kitchen, the exhaust fans may help remove heat, which helps reduce the load on HVAC system 120. When the kitchen is not generating a lot of heat, the exhaust fans may remove air conditioned air, which increases the load on HVAC system 120. In this manner, control of various aspects of different systems may be consolidated to provide optimal control of the environment within a space while enhancing energy savings.

In certain embodiments, the operational commands may also be based on a predetermined schedule and/or predetermined dependency rules between one or more individual components of the one or more systems. Equipment management system 100 may be configured to operate using manual control from a user interface, using a time based schedule, using cascading or dependency rules, and/or using any other suitable mechanism. Cascading or dependency rules may be used to logically connect multiple rule conditions to trigger a particular action. For example, an action may be triggered in response to one or more triggering events. An example of a dependency rule is to trigger building lights to be turned off and to put an HVAC system in an unoccupied mode when an outside light level goes below a certain threshold. Another example of a dependency rule is to trigger an alarm when a refrigerator door is open for more than a predetermined amount of time, for example, more than five minutes. Equipment management system 100 is configured to allow an operator to program the controller 102 with any number of cascading or dependency rules. In this manner, the operational commands may be guided by a framework of a schedule and/or dependency rules that reflect the desired operation of a user/operator. As a result, the operational commands may satisfy the demands of the operator while still optimizing the operation of the systems for other considerations such as energy efficiency, reduced wear and tear, and avoiding unnecessary operation of various equipment.

In certain embodiments, equipment management system 100 provides the ability to communicate detailed operation and control information about an HVAC, refrigeration, and/or automation system over a network (e.g. the Internet). Equipment management system 100 may employ an Internet connection that allows different systems and sensors to be monitored and controlled remotely, for example, using a web browser or mobile application. Equipment management system 100 may provide a level of detail sufficient to allow extensive analytics, data mining, and advanced heuristics to be performed on the building data and optimization of the entire building. These optimizations may increase efficiency, reduce costs to the building owner, reduce maintenance costs, and/or reduce downtimes of key systems.

Server 150 may communicate alerts based on telemetry data received from equipment, including HVAC, refrigeration, and automation equipment. Traditional systems may trigger alerts only when equipment senses a problem with the problem. However, the ability of equipment to sense a problem may be limited. Equipment may only communicate an alert upon failure of a component of the equipment. In some embodiments, equipment may not communicate custom alerts based on customized thresholds. Thus, a user is unable to adjust the sensitivity to apply to alerts. In certain embodiments, equipment management system 100 may generate and communicate alerts based on analyzing telemetry data received from the equipment. For example, server 150 may remotely analyze telemetry data to determine potential problems with the equipment. Analyzing data allows server 110 to communicate preventative alerts (e.g., indicating that equipment, while having not failed, is operating improperly) and customized alerts.

In traditional systems, alerts are triggered when equipment senses a problem. Traditional systems may generate alerts from physical sensors on the equipment. For example, HVAC equipment and/or automation equipment may determine that a component of the equipment failed. Receiving alerts directly from equipment may not allow a system to communicate customized alerts and/or preventative alerts. Equipment management system 100, in certain embodiments, may infer whether a system is not operating normally through data analysis. Determining whether a system is operating properly using data analysis provides the technical advantage of allowing a system to communicate preventative alerts before an equipment component fails. Additionally, in some embodiments, equipment management system 100 may generate configurable alerts, allowing a user to adjust the sensitivity of alerts. This may provide a customized experience to suit the needs of different users.

Server 150 may receive the telemetry data from the equipment and analyze the data to generate alerts. Receiving data allows server 110 to remotely analyze the telemetry data to determine a potential problem with equipment. For example, server 150 may receive temperature information from HVAC equipment 120 and/or any other suitable component. In an example embodiment, server 150 receives a set temperature for HVAC equipment 120 indicating a temperature that the equipment is set to maintain a room temperature and a room temperature for the room that the equipment is heating or cooling. In this example embodiment, server 150 may generate an alert upon a determination that the set temperature and the room temperature differ by a predetermined number of degrees. This allows equipment management system 100 to determine a potential problem with the equipment and generate an alert, even if the equipment has not failed. This allows for earlier alerts for potential problems with equipment.

As another example, server 150 and/or controller 110 may determine whether a building is occupied. For example, equipment, through the use of, e.g., sensors, may determine whether a building is occupied. As another example, a user may set a schedule indicating when a building is occupied. A user may customize alerts relating to building occupancy. For example, if server 150 and/or controller 110 determines that a door is unlocked and/or open when a building is occupied, server 150 may generate an alert for a user. Server 150 and/or controller 110 may determine whether a door is unlocked and/or opened using telemetry data received from equipment. This disclosure contemplates a user receiving any suitable type of customized alerts based on telemetry data received from equipment.

FIG. 4 illustrates an example equipment management system 400 including two sets of equipment 150, 155, according to certain embodiments. In certain embodiments, equipment management system 400 may management more than one set of equipment. For example, equipment management system 400 may manage a first set equipment 150 and a second set of equipment 155. Each set may include one or more of HVAC systems 120, 125, refrigeration systems 130, 135, and automation systems 140, 145. In some embodiments, equipment management system 400 may manage equipment for more than one user. For example, first set of equipment 150 may be controlled by a first user and second set of equipment may be controlled by a second user. Equipment management system 400 may still be able to provide the user-configured benefits described above despite managing equipment for different users.

Equipment management system 400 may allow each of first and second users to input information separately through one or more portals on server 150. This input information may be isolated to the particular set of equipment under that user's control. For example, first user's information may only be used to control first set of equipment 150 and second user's information may only be used to control second set of equipment 155. For example, in certain embodiments, equipment management system 400 may receive user input form the first user and control the operation of a first remote system controlled by the user, such as first set of equipment 150, based on the user input received from the first user. Equipment management system 400 may then ignore this user input when operating a second remote system, such as second set of equipment 155. In this manner, each user may customize the operation of their remote systems, while at the same time accessing a centralized equipment management system. This may provide the further technical effect of compiling information regarding different types of systems and using that information to improve the operation of systems operated by another.

FIG. 5 is a flowchart diagram of an example method 500 of using equipment management system 100, according to certain embodiments. In particular embodiments, various components of equipment management system 100 perform the steps of method 500. Method 500 may begin at step 510, wherein telemetry data associated with the operation of one or more remote systems, such as HVAC systems 120, refrigeration system 130, and/or automation system 150, is received. The received telemetry may include not only basic telemetry, such as the simple telemetry in basic telemetry 310, but also additional telemetry, such as the more robust and detailed telemetry in enhanced telemetry 320. In some embodiments, the telemetry data may be first received at controller 110 before being communicated to and received at server 150.

At step 520, one or more operational commands for the one or more remote systems is determined. For example, server 150 may use the received telemetry data to determine the optimal operation of the remote systems, which may also include comparing the desired operation based on a schedule or predetermined rules to efficiency or power consumption considerations.

After determining the operational commands, method 500 may move to step 530, in which the operational commands are communicated to the one or more remote systems. For example, server 150 may communicate the determined operational commands to controller 110, which may then forwards said commands to the remote systems. In some embodiments, controller 110 may use different protocols for receiving the operational commands and communicating the commands to the remote systems. Method 500 may end after step 530, thereby providing operational commands to the remote systems through equipment management system 100. In some embodiments, method 500 may be repeated at periodic intervals or in response to certain received telemetry data or user input to provide updated operational commands.

Modifications, additions, or omissions may be made to method 500 depicted in FIG. 5. Method 500 may include more, fewer, or other steps. Additionally, steps may be performed in parallel or in any suitable order. While discussed as various components of system 100 performing the steps, any suitable component or combination of components of system 200 may perform one or more steps of the method.

Certain embodiments may provide one or more technical advantages. For example, certain embodiments may use telemetry data associated with the operation of the one or more remote HVAC, refrigeration, and automation systems including data associated with individual components of the one or more remote systems to control the one or more remote systems. Because of the use of this more specific and detailed telemetry data, the monitoring and control of the remote systems may be enhanced. For example, the additional telemetry data may provide additional transparency into the operation of the components of the one or more remote systems, which may then be used to compile detailed statistics of their operation over time and of the effects each system has one the others. As another example, certain embodiments may predict when one or more of the remote systems will require maintenance based on the received telemetry data. In response, certain embodiments may notify the operator or user of the remote systems to alert the user to conduct maintenance on the particular system. As yet another example, certain embodiments allow a user to interact with the equipment management system to provide direct control of the remote systems and/or input of information associated with the equipment under that user's control. In this manner, users may have easier remote access to the variety of systems under their control and provide information that can be used by the equipment management system to control those systems.

Certain embodiments may include none, some, or all of the above technical advantages. One or more other technical advantages may be readily apparent to one skilled in the art from the figures, descriptions, and claims included herein.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

What is claimed is:

1. An equipment management system, comprising:
 a controller and a server, wherein the controller is configured to:
  communicatively couple to one or more remote systems, at least one of the remote systems comprising a heating, ventilation, and air conditioning (HVAC) system, a refrigeration system, or a building automation system;
  receive telemetry data associated with the operation of the one or more remote systems, wherein the received telemetry data comprises data associated with individual components of the one or more remote systems; and
communicate at least a portion of the received telemetry data to the server;
the server configured to:
determine one or more operational commands for the one or more remote systems, the one or more operational commands determined based on the telemetry data communicated from the controller to the server; and
communicate the one or more operational commands to the controller;
the controller further configured to:
communicate the one or more operational commands to the one or more remote systems;
wherein:
the received telemetry data further comprises energy usage information of individual components of the one or more remote systems; and
the operational commands are based on the energy usage information.

2. The equipment management system of claim 1, the equipment management system further configured to:
analyze the received telemetry data in order to make a prediction of when the one or more remote systems will require maintenance; and
communicate an indication to a user that indicates the prediction of when the one or more remote systems will require maintenance.

3. The equipment management system of claim 1, wherein:
the server is further configured to instruct the controller to suppress one or more types of alerts;
the controller is further configured to:
receive a plurality of alerts from the remote systems;
suppress a subset of the alerts that correspond to the one or more types of alerts that the server has instructed the controller to suppress; and
communicate to the server a subset of the alerts other than the one or more types of alerts that the server has instructed the controller to suppress.

4. The equipment management system of claim 1, wherein the server is further configured to:
receive an instruction to suppress one or more types of alerts from being communicated to a user;
receive a plurality of alerts from the one or more remote systems, the plurality of alerts received via the controller;
suppress a subset of the alerts that correspond to the one or more types of alerts that the server has been instructed to suppress; and
communicate to the user a subset of the alerts other than the one or more types of alerts that the server has been instructed to suppress.

5. The equipment management system of claim 1, wherein the operational commands are further based on a predetermined schedule and/or predetermined dependency rules between one or more individual components of the one or more remote systems.

6. The equipment management system of claim 1, wherein:
the equipment management system is configured to receive user-input over a network and to use the user input to control the operation of the one or more remote systems.

7. The equipment management system of claim 1, wherein:
the one or more remote systems comprise a first remote system associated with a first customer and a second remote system associated with a second customer that is different than the first customer;
the equipment management system is configured to:
receive user input form the first customer;
control the operation of the first remote system based on the user input received from the first customer; and
when controlling the operation of the second remote system, ignore the user input received from the first user.

8. A method for managing equipment, comprising:
receiving telemetry data associated with the operation of one or more remote systems, wherein:
the received telemetry data comprises data associated with individual components of the one or more remote systems; and
at least one of the remote systems comprises a heating, ventilation, and air conditioning (HVAC) system, a refrigeration system, or a building automation system;
determining one or more operational commands for the one or more remote systems, the one or more operational commands determined based on at least a portion of the telemetry data; and
communicating the one or more operational commands to the one or more remote systems;
wherein:
the received telemetry data further comprises energy usage information of individual components of the one or more remote systems; and
the operational commands are based on the energy usage information.

9. The method of claim 8, further comprising:
analyzing the received telemetry data in order to make a prediction of when the one or more remote systems will require maintenance; and
communicating an indication to a user that indicates the prediction of when the one or more remote systems will require maintenance.

10. The method of claim 8, further comprising:
receiving a plurality of alerts from the remote systems; and
suppressing a subset of the alerts based on at least the received telemetry data associated with the operation of one or more remote systems.

11. The method of claim 8, further comprising:
receiving an instruction to suppress one or more types of alerts from being communicated to a user;
receive a plurality of alerts from the one or more remote systems;
suppressing a subset of the alerts that correspond to the one or more types of alerts that the server has been instructed to suppress; and
communicating to the user a subset of the alerts other than the one or more types of alerts that has been instructed to suppress.

12. The method of claim 8, wherein the operational commands are further based on a predetermined schedule and/or predetermined dependency rules between one or more individual components of the one or more remote systems.

13. The method of claim 8, further comprising:
receiving user-input over a network; and
using the user input to control the operation of the one or more remote systems.

14. The method of claim 8, wherein:
the one or more remote systems comprise a first remote system associated with a first customer and a second remote system associated with a second customer that is different than the first customer; and
the method further comprises:
receiving user input form the first customer;
controlling the operation of the first remote system based on the user input received from the first customer; and
when controlling the operation of the second remote system, ignoring the user input received from the first user.

15. A non-transitory computer readable medium comprising instructions for causing processing circuitry to:
receive telemetry data associated with the operation of one or more remote systems, wherein:
the received telemetry data comprises data associated with individual components of the one or more remote systems; and
at least one of the remote systems comprises a heating, ventilation, and air conditioning (HVAC) system, a refrigeration system, or a building automation system;
determine one or more operational commands for the one or more remote systems, the one or more operational commands determined based on at least a portion of the telemetry data; and
communicate the one or more operational commands to the one or more remote systems;
wherein:
the received telemetry data further comprises energy usage information of individual components of the one or more remote systems; and
the operational commands are based on the energy usage information.

16. The computer readable medium of claim 15, wherein the instructions further cause the processing circuitry to:
analyze the received telemetry data in order to make a prediction of when the one or more remote systems will require maintenance; and
communicate an indication to a user that indicates the prediction of when the one or more remote systems will require maintenance.

17. The computer readable medium of claim 15, wherein the instructions further cause the processing circuitry to:
receive a plurality of alerts from the remote systems; and
suppress a subset of the alerts based on at least the received telemetry data associated with the operation of one or more remote systems.

18. The computer readable medium of claim 15, wherein:
the one or more remote systems comprise a first remote system associated with a first customer and a second remote system associated with a second customer that is different than the first customer; and
the instructions further cause the processing circuitry to:
receive user input form the first customer;
control the operation of the first remote system based on the user input received from the first customer; and
when controlling the operation of the second remote system, ignore the user input received from the first user.

19. An equipment management system, comprising:
a controller and a server, wherein the controller is configured to:
communicatively couple to one or more remote systems, at least one of the remote systems comprising a heating, ventilation, and air conditioning (HVAC) system, a refrigeration system, or a building automation system;
receive telemetry data associated with the operation of the one or more remote systems, wherein the received telemetry data comprises data associated with individual components of the one or more remote systems; and
communicate at least a portion of the received telemetry data to the server;
the server configured to:
determine one or more operational commands for the one or more remote systems, the one or more operational commands determined based on the telemetry data communicated from the controller to the server;
communicate the one or more operational commands to the controller;
receive an instruction to suppress one or more types of alerts from being communicated to a user;
receive a plurality of alerts from the one or more remote systems, the plurality of alerts received via the controller;
suppress a subset of the alerts that correspond to the one or more types of alerts that the server has been instructed to suppress; and
communicate to the user a subset of the alerts other than the one or more types of alerts that the server has been instructed to suppress; and
the controller further configured to communicate the one or more operational commands to the one or more remote systems.

20. A method for managing equipment, comprising:
receiving telemetry data associated with the operation of one or more remote systems, wherein:
the received telemetry data comprises data associated with individual components of the one or more remote systems; and
at least one of the remote systems comprises a heating, ventilation, and air conditioning (HVAC) system, a refrigeration system, or a building automation system;
determining one or more operational commands for the one or more remote systems, the one or more operational commands determined based on at least a portion of the telemetry data;
communicating the one or more operational commands to the one or more remote systems;
receiving a plurality of alerts from the remote systems; and
suppressing a subset of the alerts based on at least the received telemetry data associated with the operation of one or more remote systems.

21. A method for managing equipment, comprising:
receiving telemetry data associated with the operation of one or more remote systems, wherein:
the received telemetry data comprises data associated with individual components of the one or more remote systems; and
at least one of the remote systems comprises a heating, ventilation, and air conditioning (HVAC) system, a refrigeration system, or a building automation system;

determining one or more operational commands for the one or more remote systems, the one or more operational commands determined based on at least a portion of the telemetry data;
communicating the one or more operational commands to the one or more remote systems;
receiving an instruction to suppress one or more types of alerts from being communicated to a user;
receive a plurality of alerts from the one or more remote systems;
suppressing a subset of the alerts that correspond to the one or more types of alerts that the server has been instructed to suppress; and
communicating to the user a subset of the alerts other than the one or more types of alerts that has been instructed to suppress.

* * * * *